3,793,318
1,2,4-BENZOTHIADIAZINE-1,1-DIOXIDE DERIVATIVES
Victor Lafon, Paris, France, assignor to Societe Anonyme dite: Laboratoire L. Lafon, Maisens-Alfort, France
No Drawing. Filed Sept. 27, 1971, Ser. No. 184,279
Claims priority, application Great Britain, Oct. 2, 1970, 47,052/70
Int. Cl. C07d 93/34
U.S. Cl. 260—243 D           5 Claims

ABSTRACT OF THE DISCLOSURE

Novel compounds of formula:

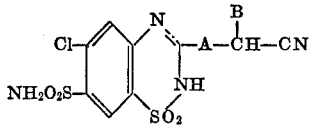

in which A represents a single bond or an alkylene group with a straight or branched chain of 1 to 5 carbon atoms, B represents a hydrogen atom or an alkyl, aryl or nitrile group, and the dotted bond indicates that the 1,2,4-benzothiadiazine nucleus can be saturated or unsaturated in the 3,4-position, are provided having good diuretic activity.

---

The present invention relates to new derivatives of 1,2,4-benzothiadiazine-1,1-dioxide having diuretic properties.

More particularly, the invention provides compounds of formula:

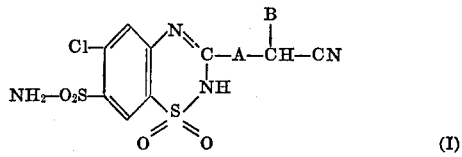

in which A represents a single bond or a straight or branched alkylene chain with 1 to 5 carbon atoms, e.g. 1,1-dimethyl-ethylene, B represents a hydrogen atom or an aryl, e.g. phenyl, alkyl (e.g. of 1 to 5 carbon atoms) or nitrile group, and the dotted bond indicates that the 1,2,4-benzothiadiazine nucleus can be saturated or unsaturated in the 3,4-position. These compounds have valuable diuretic properties.

The process for preparing the compounds of this invention consists of reacting 2-chloro-4-aminobenzene-1,5-disulphonamide with a compound of formula:

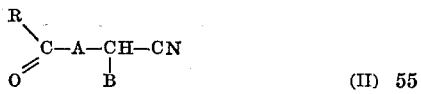

in which R represents a chlorine or hydrogen atom, A and B are as defined above, the resulting compound being cyclized.

If the reaction is carried out with a compound of Formula II in which R is a chlorine atom, a compound of Formula III:

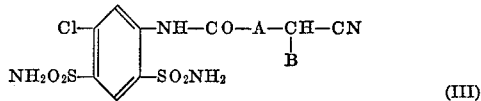

is first obtained. It can be cyclized by heating under reflux in the presence of a base such as triethanolamine, preferably in a solvent such as absolute alcohol, yielding a compound of Formula I in which the bond in the 3,4-position is unsaturated.

If the reaction is carried out with a compound of Formula II in which R is a hydrogen atom, in a solvent such as ethanol containing hydrogen chloride, a compound of Formula I, in which the 3,4-bond is saturated, is obtained in a single step by cyclization.

When A represents a single bond, it is possible to react 2-chloro-4-aminobenzene-1,5-disulphonamide with the sodium derivative of a vinyl alcohol of formula:

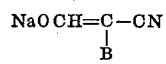

in a solvent such as ethanol containing hydrogen chloride, and the compound of Formula I in which the 3,4-bond is saturated and A represents a single bond is obtained in a single step.

The following examples illustrate the invention.

EXAMPLE 1

3-cyanomethyl-6-chloro-7-sulphamoyl-1,2,4-benzothiadiazine-1,1-dioxide

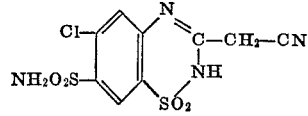

11.2 g. (0.04 mol) of 2-chloro-4-aminobenzene-1,5-disulphonamide and 5.2 g. of cyanacetyl chloride in 100 ml. of dioxane are heated for 1 hour under reflux in a 250 ml. ground-neck flask equipped with a condenser. The mixture is then filtered and the filtrate evaporated to dryness. The residue is taken up in 50 ml. of water, filtered off, and washed with two 50 ml. portions of hot water, then with 20 ml. of methanol and finally with ether.

4 g. (0.011 mol) of 3'-chloro-4',6'-disulphamoylcyanacetanilide, M.P. 290° C., are thus obtained. This substance is cyclized by heating under reflux for 4 hours in a solution of 4 ml. of triethanolamine in 25 ml. of absolute ethanol. The ethanol is then evaporated in vacuo. The residue is taken up in water. The mixture is acidified with 36° Bé. hydrochloric acid, and the product is filtered off and dried.

It is recrystallized from a mixture of acetone and diethyl ether, and 3.2 g. (38% yield) of a white powder, M.P. about 300° C., are obtained, which is sparingly soluble in water, alchohols and diethyl ether, but more soluble in acetone and dioxane.

EXAMPLE 2

3 - (3 - cyano - 1,1 - dimethyl-propyl)-6-chloro-7-sulphamoyl - 3,4 - dihydro - 1,2,4 - benzothiadiazine-1,1-dioxide

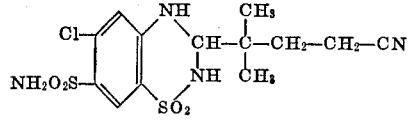

A suspension of 14.5 g. (0.05 mol) of 2-chloro-4-aminobenzene - 1,5 - disulphonamide in 100 ml. of an 18% solution of hydrogen chloride in ethanol is vigorously stirred, and 7.5 g. (0.06 mol) of 4-formyl-4-methyl-valeronitrile are added. After a gentle rise in temperature, a clear brown solution is obtained. The mixture is stirred for a further half hour, 400 ml. of cold water are added, and the product is filtered off, washed with water until neutral, then with two 50 ml. portions of boiling water, and finally with 10 ml. of ethanol and 10 ml. of diethyl ether. It is dried and recrystallized from a ½ dimethylformamide-water mixture.

3-(3-cyano-1,1 - dimethyl - propyl) - 6 - chloro - 7-suphamoyl - 3,4 - dihydro - 1,2,4 - benzothiadiazine-1,1- dioxide is thus obtained in a yield of 73%. It forms small yellowish-white crystals melting at 254–256° C. It is insoluble in water, diethyl ether, dioxane and methanol, sparingly soluble in ethanol and acetone, and soluble in dimethylforamide.

EXAMPLE 3

3-(α-cyano-benzyl) - 6 - chloro - 7 - sulphamoyl-3,4-dihydro-1,2,4-benzothiadiazine-1,1-dioxide

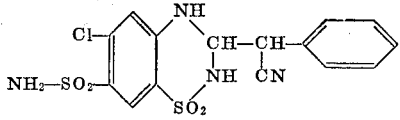

A mixture of 1.45 g. (0.005 mol) of 2-chloro-4-aminobenzene-1,5-disulphonamide and 1 g. (0.007 mol) of α-formyl-phenylacetonitrile in 12.5 ml. of a 15% solution of hydrogen chloride in ethanol are heated in a 100 ml. ground-neck flask, on a water bath. The reagents dissolve and a yellow precipitate appears almost immediately. The duration of heating is 2 to 3 minutes. The mixture is cooled and the product is filtered off and successively washed with ethanol, water, ethanol and diethyl ether.

It is recrystallized from acetone and 1.6 g. (78%) of 3 - (α - cyano-benzyl) - 6 - chloro-7-sulphamyl-3,4-dihydro-1,2,4-benzothiadiazine-1,1-dioxide are obtained in the form of creamy white spangles, M.P. 290–295° C., which are soluble in acetone, sparingly soluble in ethanol and diethyl ether, very sparingly soluble in water at pH <7 and soluble in dilute alkaline solutions.

EXAMPLE 4

3-dicyanomethyl-6-chloro-7-sulphamoyl-3,4-dihydro-1,2,4-benzothiadiazine-1,1-dioxide

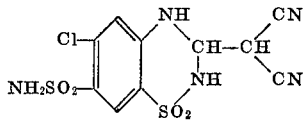

A suspension of 7.25 g. (0.025 mol) of 2-chloro-4-aminobenzene-1,5-disulphonamide in 60 ml. of a 20% solution of hydrogen chloride in ethanol is vigorously stirred. 6 g. (0.05 mol) of the sodium derivative of the dicyanovinyl alcohol are added in 3 portions. The mixture is stirred for a further 2 hours. After cooling overnight, a pasty precipitate is obtained, which is filtered off, washed with cold water until neutral, dried, washed with a little cold acetone to remove the starting amine, and recrystallized from a mixture of dimethylformamide and ethanol.

4.6 g. of 3 - dicyanomethyl - 6 - chloro-7-sulphamoyl-3,4 - dihydro - 1,2,4 - benzothiadiazine-1,1-dioxide (a yield of 51%) are obtained in the form of small white crystals, M.P. above 280° C., which are insoluble in water, ethanol and diethyl ether, sparingly soluble in acetone, and soluble in dimethylforamide and alkaline solutions.

The compounds of this invention have been the subject of pharmacological and clinical experiments.

Acute toxicity studies have shown that these compounds are practically devoid of toxicity if orally administered to rats; no fatality was observed after administration of 10 g./kg. The only symptom observed is a slight pinkish coloration of the teguments. Gastric tolerance is excellent at a daily dose of 100 to 300 mg./rat.

The compound of Example 2 has been used experimentally in man at a dose of 50 mg. administered orally two to three times daily, in the treatment of cirrhosis with oedematoascitic swelling and in the treatment of caridiac insufficiency with oedema of the lower limbs. The compound has a very favorable effect on the diuresis without exerting any harmful side effect.

The results obtained in a few cases are given below by way of examples:

P.J., 79 years old, diabetic and on a salt-free diet, with moderate cardiac insufficiency and a left hemiplegia in course of recovery, suffered from oedema of the limbs, without renal insufficiency. During the period preceding the treatment, the volume of urine collected in 24 hours varied from 600 to 800 ml. After 2 days' treatment, this volume had increased to 1500 ml. and remained at this level throughout the treatment. No side effects whatsoever of the medicine were observed.

C.F., 73 years old, suffered from a cirrhosis with oedematoascitic swelling, without renal insufficiency. On a strictly salt-free diet, the volume of urine emitted during the period preceding the treatment varied from 500 to 750 ml. over the course of 24 hours. During the treatment the volume increased to 1000–1050 ml. No side effects whatsoever were observed.

The compound of Example 4 has also been found to possess a moderate diuretic action which is very useful in man at a dose fo 5 mg. given orally 2 to 6 times daily.

A summary of some cases, below, is given by way of example:

L.R., 64 years old, suffered from a left ventrciular insufficiency and an aortic shrinkage, with pulmonary oedema, without renal insufficiency. Before the treatment, the volume of urine was about 500 ml. per day; after treatment, it increased to 1000 ml. per day.

U.J., 74 years old, suffered from a cardiac insufficiency treated with digitalin, the urea level of the blood being 1.45 g. per thousand. The volume of urine was doubled after the treatment, the urea level of the blood being unchanged.

B.P., 52 years old, suffered from an arterial global cardiac insufficiency, without renal insufficiency. The diuresis increased from about 500 ml. before the treatment to 1000 ml. on the 2nd day after the start of the treatment.

In all cases, the compound was very well tolerated.

The compounds according to the invention are hence useful as gentle diuretics which are particularly valuable because of the absence of side effects and because of the excellent tolerance of the compounds.

For preparing pharmaceutical compositions from the physiologically active compounds of this invention, solid or liquid pharmaceutically acceptable carriers can be used. Solid form preparations include powders, tablets, dispersible granules, capsules, cachets and suppositories. Typical solid carriers include substances acting as diluents, flavoring agents, solubilizers, lubricants, suspending agents, binders or tablet-disintegrating agents; the solid carrier can also be an encapsulating material. In powders, the carrier is a finely divided solid which is in admixture with the finely divided compound. In the tablet the compound is mixed with a carrier having the necessary binding properties in suitable proportions and compacted in the shape and size desired. The powders and tablets preferably contain from 1 to 95% by weight of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax and cocoa butter. The term "preparation" is intended to include the formation of the compound with encapsulating material as carrier providing a capsule in which the compound (with or without other carriers) is surrounded by carrier, which is thus in association with it. Similarly, cachets are included. Tablets, powders, cachets and capsules can be used for oral administration.

Liquid form preparations include solutions, suspensions and emulsions. By way of example water-propylene glycol solutions may be mentioned. Liquid preparations can also be formulated in solution in aqueous polyethylene glycol solutions, or in oil. Aqueous suspensions suitable for oral use can be made by dispensing the finely divided compound in water with viscous material, natural or synthetic gums, resins, etc., for example, gum arabic, ionexchange resins, methyl cellulose, sodium carboxymethyl cellulose and other well-known suspending agents.

Preferably, the pharmaceutical preparation is in unit dosage form. In such form, the preparation is subdivided in unit doses containing appropriate quantities of the compound, the unit dosage form can be a packaged preparation, the package containing discrete quantities of preparation, for example, packeted powders, vials or ampoules.

The unit dosage form can be a capsule, cachet or tablet or it can be an appropriate number of such materials in packaged form. The quantity of compound in a unit dose of preparation may be varied or adjusted from 5 to 100 mg. according to the particular application desired and the potency of the active ingredient.

I claim:

1. A compound of the formula:

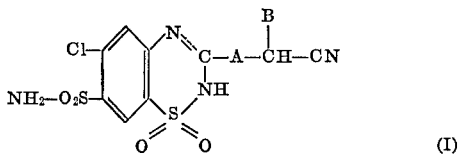

(I)

in which A is a carbon-carbon bond or straight or branched alkylene of 1 to 5 carbon atoms, B is hydrogen, alkyl of 1 to 5 carbon atoms, phenyl or nitrile group, and the dotted bond indicates that the 1,2,4-benzothiadiazine nucleus can be saturated or unsaturated in the 3,4-position.

2. 3 - cyanomethyl - 6 - chloro - 7 - sulphamoyl - 1,2,4-benzothiadiazine-1,1-dioxide.

3. 3 - (3 - cyano - 1,1 - dimethyl - pyropyl) - 6 - chloro-7 - sulphamoyl - 3,4 - dihydro - 1,2,4 - benzothiadiazine-1,1-dioxide.

4. 3 - ($\alpha$ - cyano - benzyl) - 6 - chloro - 7 - sulphamoyl-3,4-dihydro-1,2,4-benzothiadiazine-1,1-dioxide.

5. 3 - dicyanomethyl - 6 - chloro - 7 - sulphamoyl - 3,4-dihydro-1,2,4-benzothiadiazine-1,1-dioxide.

References Cited
UNITED STATES PATENTS 3,133,060  5/1964  Buck et al. _____ 260—243

JOHN M. FORD, Primary Examiner

U.S. Cl. X.R.

426—246